(12) United States Patent
Nyström et al.

(10) Patent No.: US 7,562,221 B2
(45) Date of Patent: Jul. 14, 2009

(54) AUTHENTICATION METHOD AND APPARATUS UTILIZING PROOF-OF-AUTHENTICATION MODULE

(75) Inventors: Magnus Nyström, Valentuna (SE); Anders Rundgren, Almunge (SE); William M. Duane, Westford, MA (US)

(73) Assignee: RSA Security Inc., Bedford, MA (US)

( * ) Notice: Subject to any disclaimer, the term of this patent is extended or adjusted under 35 U.S.C. 154(b) by 365 days.

(21) Appl. No.: 11/530,998

(22) Filed: Sep. 12, 2006

(65) Prior Publication Data

US 2007/0094498 A1 Apr. 26, 2007

Related U.S. Application Data

(60) Provisional application No. 60/718,978, filed on Sep. 21, 2005.

(51) Int. Cl.
    *H04L 9/32* (2006.01)
(52) U.S. Cl. .................... 713/168; 380/247; 726/2; 726/5; 726/8; 726/9; 726/10; 705/67; 455/411
(58) Field of Classification Search ............ 713/155, 713/159, 168; 380/247; 726/2–3, 5, 8–10; 705/67; 455/411
See application file for complete search history.

(56) References Cited

U.S. PATENT DOCUMENTS

| | | | |
|---|---|---|---|
| 5,361,062 A | | 11/1994 | Weiss et al. |
| 5,491,752 A | | 2/1996 | Kaufman et al. |
| 5,721,779 A | | 2/1998 | Funk |
| 6,587,880 B1 * | | 7/2003 | Saigo et al. ............ 709/225 |
| 7,139,916 B2 * | | 11/2006 | Billingsley et al. .......... 713/182 |
| 2001/0055388 A1 | | 12/2001 | Kaliski, Jr. |
| 2003/0033535 A1 * | | 2/2003 | Fisher et al. ............... 713/185 |
| 2003/0188193 A1 * | | 10/2003 | Venkataramappa ......... 713/201 |

(Continued)

FOREIGN PATENT DOCUMENTS

WO WO 2006/014358 A1 2/2006

(Continued)

OTHER PUBLICATIONS

B. Schneier, "Applied Cryptography," Universal Electronic Payment System (UEPS), Second Edition, John Wiley & Sons, p. 589.

(Continued)

*Primary Examiner*—Minh Dieu Nguyen
(74) *Attorney, Agent, or Firm*—Ryan, Mason & Lewis, LLP

(57) ABSTRACT

A single sign-on technique allows multiple accesses to one or more applications or other resources using a proof-of-authentication module operating in conjunction with a standard authentication component. The application or other resource issues an authentication information request to the standard authentication component responsive to an access request from the user. The application or other resource receives, responsive to the authentication information request, a proof-of-authentication value from the standard authentication component, and authenticates the user based on the proof-of-authentication value. The standard authentication component interacts with the proof-of-authentication module to obtain the proof-of-authentication value. The proof-of-authentication module is configured to generate multiple proof-of-authentication values for authentication of respective access requests of the user.

33 Claims, 3 Drawing Sheets

U.S. PATENT DOCUMENTS

| | | | |
|---|---|---|---|
| 2003/0233546 A1* | 12/2003 | Blom | 713/168 |
| 2004/0030932 A1 | 2/2004 | Juels et al. | |
| 2006/0075224 A1* | 4/2006 | Tao | 713/164 |
| 2006/0179312 A1* | 8/2006 | Kelly et al. | 713/169 |
| 2006/0277607 A1* | 12/2006 | Chung | 726/27 |

FOREIGN PATENT DOCUMENTS

| | | |
|---|---|---|
| WO | WO 2006036762 | 9/2006 |

OTHER PUBLICATIONS

U.S. Appl. No. 09/356,600, filed Jul. 19, 1999, "System and Methods for Maintaining and Distributing Personal Security Devices."

U.S. Appl. No. 09/802,485, filed Mar. 9, 2001, "System and Method for Increasing the Security of Encrypted Secrets and Authentication."

J. Kohl et al., "The Kerberos Network Authentication Service (V5)," Internet Engineering Task Force (IETF), Request for Comments (RFC) 1510, pp. 1-105, Sep. 1993.

RSA Laboratories, "PKCS#11 v2.20: Cryptographic Token Interface Standard," Version 2.20, 46 pages, Jun. 28, 2004.

RSA Laboratories, "PKCS #11 v2.20 Amendment 1: Mechanisms for One-Time Password Tokens," Version 2.20, pp. 1-28, Dec. 27, 2005.

RSA Laboratories, "PKCS #5 v2.0: Password-Based Cryptography Standard," Version 2.0, pp. 1-30, Mar. 25, 1999.

David P. Jablon, "Strong Password-Only Authenticated Key Exchange," ACM Computer Communications Review, ACM SIGCOMM, vol. 26, No. 5, pp. 1-22, Oct. 1996.

S.M. Bellovin et al., "Encrypted Key Exchange: Password-Based Protocols Secure Against Dictionary Attacks," Proceedings of the IEEE Symposium on Research in Security and Privacy, IEEE, 13 pages, May 1992.

T. Dierks et al., "The TLS Protocol, Version 1.0," IETF RFC 2246, pp. 1-83, Jan. 1999.

* cited by examiner

AUTHENTICATION METHOD AND APPARATUS UTILIZING PROOF-OF-AUTHENTICATION MODULE

RELATED APPLICATION(S)

The present application claims the priority of U.S. Provisional Patent Application Ser. No. 60/718,978, filed Sep. 21, 2005 and entitled "Proof-of-Authentication Method Offering Single Sign-On for End Users," the disclosure of which is incorporated by reference herein.

FIELD OF THE INVENTION

The present invention relates generally to cryptographic techniques for authenticating users over a network or in other types of communication systems.

BACKGROUND OF THE INVENTION

In order to gain access to applications or other resources via a computer or other user device, users are often required to authenticate themselves by entering authentication information. Such authentication information may comprise, for example, passwords that are generated by a security token carried by the user. These passwords may be one-time passwords that are generated using a time-synchronous or event-based algorithm. Other types of authentication information may include, for example, answers to so-called "life questions." One particular example of a well-known type of security token is the RSA SecurID® hardware-based user authentication token commercially available from RSA Security Inc. of Bedford, Mass., U.S.A.

With respect to passwords generated by a security token, the security token may be of a type that can be electrically connected to the computer or other user device, such that the device can read a given password directly from the token. For other security tokens that are not connectable to a computer or other user device in this manner, the user may manually enter a password displayed by the token at the time of the attempted access.

A problem that arises in conventional authentication arrangements of the type described above is that the user typically has to provide authentication information separately for each application or other resource that he or she would like to access. In the case of a connectable security token, this may involve re-entering a personal identification number (PIN) each time the token is accessed by the device. In the case of a token that is not connectable, manual entry of different one-time passwords for each application may be required.

The actual authentication of the user for access to the applications generally occurs at a centralized authentication server or other authentication authority that receives the passwords or other authentication information from the user device via a network. Thus, the user may need to authenticate towards the same authentication authority a number of times in a short time frame. If the passwords are generated based on a time-synchronous algorithm, there may be a limit on how often users are able to authenticate.

One known technique that attempts to address this problem is the Kerberos Network Authentication Service, Version 5 (V5), described in J. Kohl et al., Internet Engineering Task Force (IETF), Request for Comments (RFC) 1510, September 1993. Unfortunately, applications must be modified in order to support Kerberos authentication. Moreover, Kerberos authentication requires the use of specially adapted communication protocols, and is not readily adaptable for use with standard communication protocols.

Accordingly, what is needed is an improved approach that avoids the repeated entry of authentication information but does not require changes to existing applications or communication protocols.

SUMMARY OF THE INVENTION

The present invention in the illustrative embodiments described herein provides single sign-on authentication techniques that allow multiple accesses to one or more applications or other resources using a proof-of-authentication module operating in conjunction with a standard authentication component.

In accordance with an aspect of the invention, one of the applications or other resources issues an authentication information request to the standard authentication component, responsive to an access request from the user. The authentication information may be, for example, a password or other type of authentication credential, and may be generated by a connectable or non-connectable security token, or any other technique ordinarily requiring user authentication. The application or other resource receives, responsive to the authentication information request, a proof-of-authentication value from the standard authentication component, and authenticates the user based on the received proof-of-authentication value. The standard authentication component interacts with the proof-of-authentication module to obtain the proof-of-authentication value. The proof-of-authentication module is configured to generate multiple proof-of-authentication values for authentication of respective access requests of the user. The application or other resource is not aware that the authentication information provided by the standard authentication component is a proof-of-authentication value and is unable to distinguish it from ordinary authentication information.

In an illustrative embodiment, the standard authentication component interacts with the proof-of-authentication module to obtain the proof-of-authentication value based on a ticket previously issued by a ticket issuer, with the proof-of-authentication module being configured to generate from the ticket the multiple proof-of-authentication values for authentication of respective ones of multiple access requests of the user. The ticket may be issued by the ticket issuer responsive to a successful authentication of the user based on a password or other authentication credential submitted by the user.

The proof-of-authentication module may authenticate itself to the ticket issuer using, for example, a password or other authentication credential, or a key derived from such a password or other credential. The ticket may be conveyed from the ticket issuer to the proof-of-authentication module in encrypted form, and may be stored locally by the proof-of-authentication module, for example, in encrypted form, and possibly with additional information, such as the password or other authentication credential used to acquire the ticket.

The authentication techniques of the illustrative embodiments overcome one or more of the problems associated with the conventional techniques described previously, and permit users to authenticate themselves to multiple applications, or multiple times to a single application, while avoiding repeated entry of passwords or other authentication information. Moreover, no modification of the applications or communication protocols is required. These and other features and advantages of the present invention will become more

DETAILED DESCRIPTION

The present invention will be described herein with reference to an example communication system in which a user device communicates with an authentication authority and one or more additional entities. It is to be appreciated, however, that the invention is not restricted to use in this or any other particular system configuration.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments will be described below in the context of passwords, it is to be appreciated that the invention is more broadly applicable to any other type of authentication information.

The present invention in an illustrative embodiment provides an improved single sign-on authentication process. Single sign-on in this illustrative context refers generally to an arrangement in which a user need only enter or otherwise provide his or her authentication information once in order to obtain multiple accesses to one or more access-controlled applications.

Figure 1:
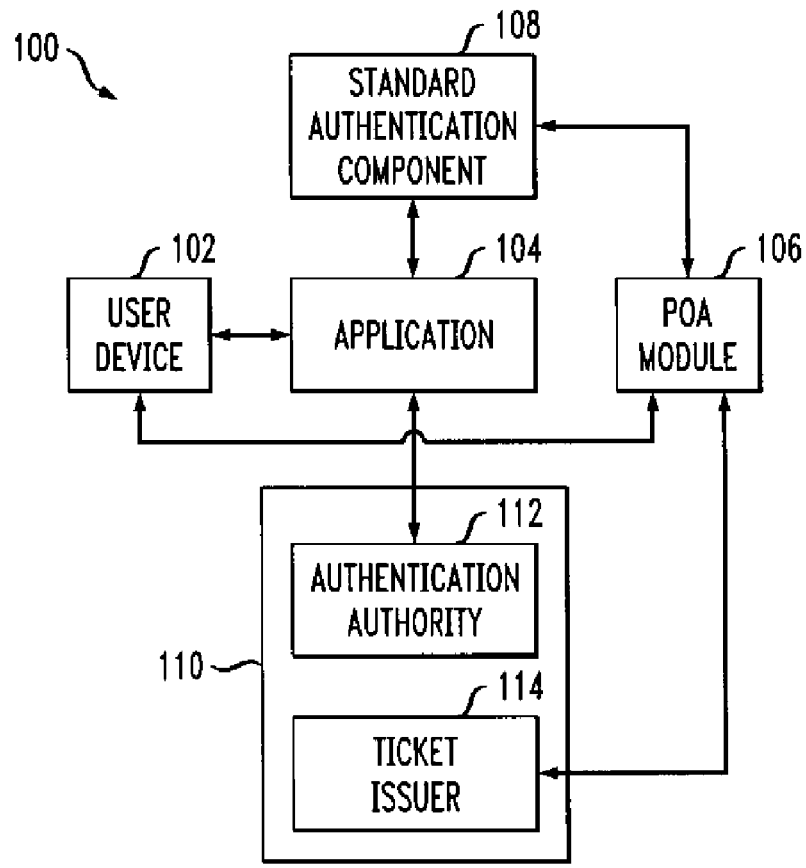
FIG. 1 is simplified block diagram of an example communication system in an illustrative embodiment of the invention.

FIG. 1 shows a simplified network-based communication system 100 which will be used to illustrate the single sign-on techniques of the invention. The system 100 includes a user device 102, an application 104, a proof-of-authentication (POA) module 106, and a standard authentication component 108. The system 100 further includes one or more servers 110 which comprise an authentication authority 112 and a ticket issuer 114.

The user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of single sign-on techniques in accordance with the invention.

The user device 102 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a user device, a person utilizing or otherwise associated with the device, or a combination of both the person and the device.

The application 104 is an access-controlled application, that is, one which grants user access responsive to an authentication process, as will be described in greater detail in conjunction with FIGS. 3 and 4. The application may be, for example, a remote application such as a web site or other software program that is accessed by the user device 102 over a network. The network, not explicitly shown in the figure, may comprise, for example, a global computer network such as the Internet, a wide area network (WAN), a local area network (LAN), a satellite network, a telephone or cable network, or various portions or combinations of these and other types of networks. An application may be viewed as an example of what is more generally referred to herein as a "resource." Alternatively, application 104 may be an application resident on the user device 102, although it is not shown as such in the figure.

The POA module 106 operates in conjunction with the standard authentication component 108 and other elements of system 100 to provide a single sign-on experience for the user device 102, as will be described in greater detail below. The POA module 106 is shown in FIG. 1 as being separate from the user device 102. It may be a server or other type of module that is accessible over a network, such as the Internet, or it may be a software component resident on the user device 102. As another alternative, it may be distributed over multiple devices, one of which may be the user device 102.

In the present embodiment, the standard authentication component 108 is implemented as a password request-detecting component. As one possible alternative, the standard authentication component can be explicitly invoked or otherwise notified of the authentication information request by the application.

Like the POA module, the standard authentication component may be separate from the user device 102, as shown in the figure, and accessible to the user device over a network or other communication medium. Alternatively, it may be incorporated into the user device itself, or implemented in a distributed manner.

The terms "module" and "component" as used herein are intended to be construed broadly, and should not be interpreted as requiring any particular physical configuration. Such elements may be, for example, part of a common processing device, or may be implemented on separate processing devices or separate sets of multiple processing devices, and each may represent software, hardware or firmware or various combinations thereof. The terms may be used interchangeably, such that a module in a given embodiment may be viewed as comprising a component of a processing device or other system element.

The application 104 interacts with the standard authentication component 108 and the authentication authority 112 of the server(s) 110. The POA module 106 interacts with the standard authentication component 108 and the ticket issuer 114 of the server(s) 110. These interactions may occur over one or more networks, or using other types of communication media. Although illustratively shown as elements of a common server or set of servers in FIG. 1, the authentication authority 112 and ticket issuer 114 may be implemented as entirely separate elements in other embodiments. As another alternative, the ticket issuer 114 may be incorporated into the authentication authority 112, such that the ticket is issued by a ticket issuing component of the authentication authority.

It is possible for the POA module 106 in the above-described embodiments to be implemented as a process running on the user device 102. Such a process would be configured to listen for password requests from the password request-detecting component. The POA module stores tickets associated with users and identified passwords, so that it is able to calculate and respond with a correct POA value when a request is made, as will be described in greater detail below.

It is to be appreciated that a given embodiment of the system 100 may include multiple instances of user device 102, application 104, POA module 106, standard authentication component 108, and possibly other system components, although only single instances of such components are shown in the simplified system diagram for clarity of illustration.

Figure 2:
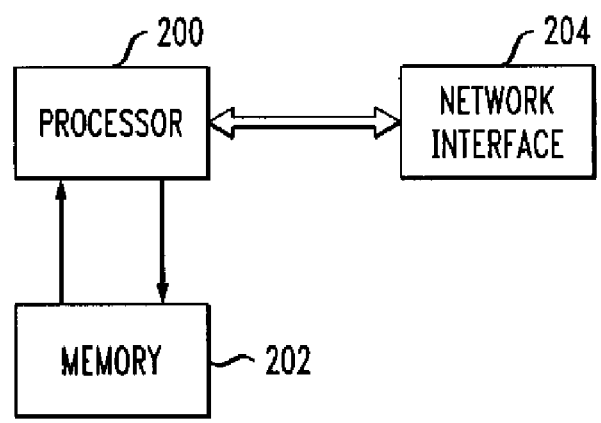
FIG. 2 illustrates one possible implementation of a given user device, server or other processing device of the FIG. 1 system.

FIG. 2 shows one possible implementation of a given processing device of the FIG. 1 system. The processing device as shown may be viewed as representing, for example, user device 102, a server or other processing device on which application 104, POA module 106 or standard authentication component 108 is running, or one or more servers 110 which collectively provide the authentication authority 112 and the ticket issuer 114. The processing device in this implementation includes a processor 200 coupled to a memory 202 and a network interface 204. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of a single sign-on technique in accordance with an embodiment of the invention can be implemented at least in part in the form of one or more software programs that are stored in memory 202 and executed by the corresponding processor 200. The memory 202 is also used for storing information used to perform computations or other operations associated with the single sign-on technique.

In operation, the standard authentication component 108, which as noted above is illustratively implemented as a password request-detecting component, detects a password request that is generated by the application 104 when a need to authenticate the user 102 arises. The password request may be, for example, a request for a one-time password. The standard authentication component 108 makes a call to the POA module 106 requesting the password. The POA module 106 determines whether or not a ticket exists for the identified password.

If a ticket exists, the POA module 106 derives a unique POA value from it and provides that value back to the application 104.

If a ticket does not exist, but is allowed for the identified password, the POA module 106 requests the password from the user 102. It is also possible that, at this point, the application or the password request-detecting component has already requested the password and provided it to the POA module. Once the password is available to it, the POA module may, for example, contact ticket issuer 114 and request a ticket for the user, possibly authenticating the request using the provided password or through some other means, or directly pass the password back to the password request-detecting component, and contact the ticket issuer thereafter. In the former case, the POA module may construct a POA once the ticket has been delivered to it, and provide the newly constructed POA back to the password request-detecting component rather than the password itself, such that the application will never see actual passwords. Regardless of the chosen option, the POA module will store the ticket associated with the user and may also or alternatively store a password identifier for future use. Thus, in a given embodiment, the ticket may be stored locally by the POA module, possibly in encrypted form, and possibly with additional information, such as the password used to acquire the ticket.

The POA module 106 may authenticate to the ticket issuer 114 using, for example, a shared secret, a one-time password or other type of password, a key derived from a password using an approach such as PBKDF2, as will be described in greater detail below, or other techniques.

The standard authentication component 108 provides the returned value to the requesting application 104. Note that the requesting application is unaware of whether the returned value is the expected password or a POA value derived from a ticket.

The application 104 attempts to authenticate the user with the provided value by communicating the value to the authentication authority 112.

If the value is a password, the authentication authority 112 validates it against its password database.

If the value is a POA value, the authentication authority checks to see that it is valid, has not been used before, and is within the designated lifetime of a session established by the authentication that caused the underlying ticket to be issued.

As mentioned above, the POA module 106 will at some point contact ticket issuer 114 requesting that a ticket be issued. The request may be authenticated by a value derived from the provided password or by some other technique or a combination thereof. Once the request has been received, the ticket issuer validates the request and, if successful, issues a ticket to the POA module for the given user and password. The ticket is sent back to the POA module, possibly in protected form. For example, it may be encrypted using a key derived from the password used to authenticate the request, or it may be encrypted using a key associated with a secure sockets layer (SSL) session. The POA module stores the received ticket associated with the user and may also or alternatively store a password identifier or other additional information for later use, as described previously.

The ticket issuer 114 communicates with the authentication authority 112 and queries the authentication authority for the latest password used by the identified user, or, alternatively, whether a provided ticket request is authentic. When a request has been accepted, the ticket issuer may generate a session key or other random secret value as a ticket. The ticket may be protected using, for example, a value derived from the user password, before the ticket issuer sends it back to the POA module.

Since it is usually desirable to keep the authenticating application 104 unaware of the existence of tickets and POA values, that application should not be used as a channel to provide a ticket back to the user device 102 for later POA use.

The POA module 106 may, upon discovering that a ticket does not exist, return a failure indication to the standard authentication component 108, in which case the password request-detecting component would request the password from the user, contact the ticket issuer requesting a ticket, possibly authenticating the request using the password, and provide the issued ticket to the POA module for storage and future use once the ticket has been received. In this case, the standard authentication component 108 would request a POA value from the POA module after having provided the ticket to the POA module. The standard authentication component could also provide the user-supplied password to the requesting application before requesting a ticket.

Again, although passwords are referred to in the context of the particular embodiment just described, the techniques may be of course implemented using other types of credentials or more generally other authentication information. In addition, although described in the context of applications, the techniques are applicable in a straightforward manner to a wide variety of other types of access-controlled resources, and such resources may be local to or remote from the user device.

Figure 3:
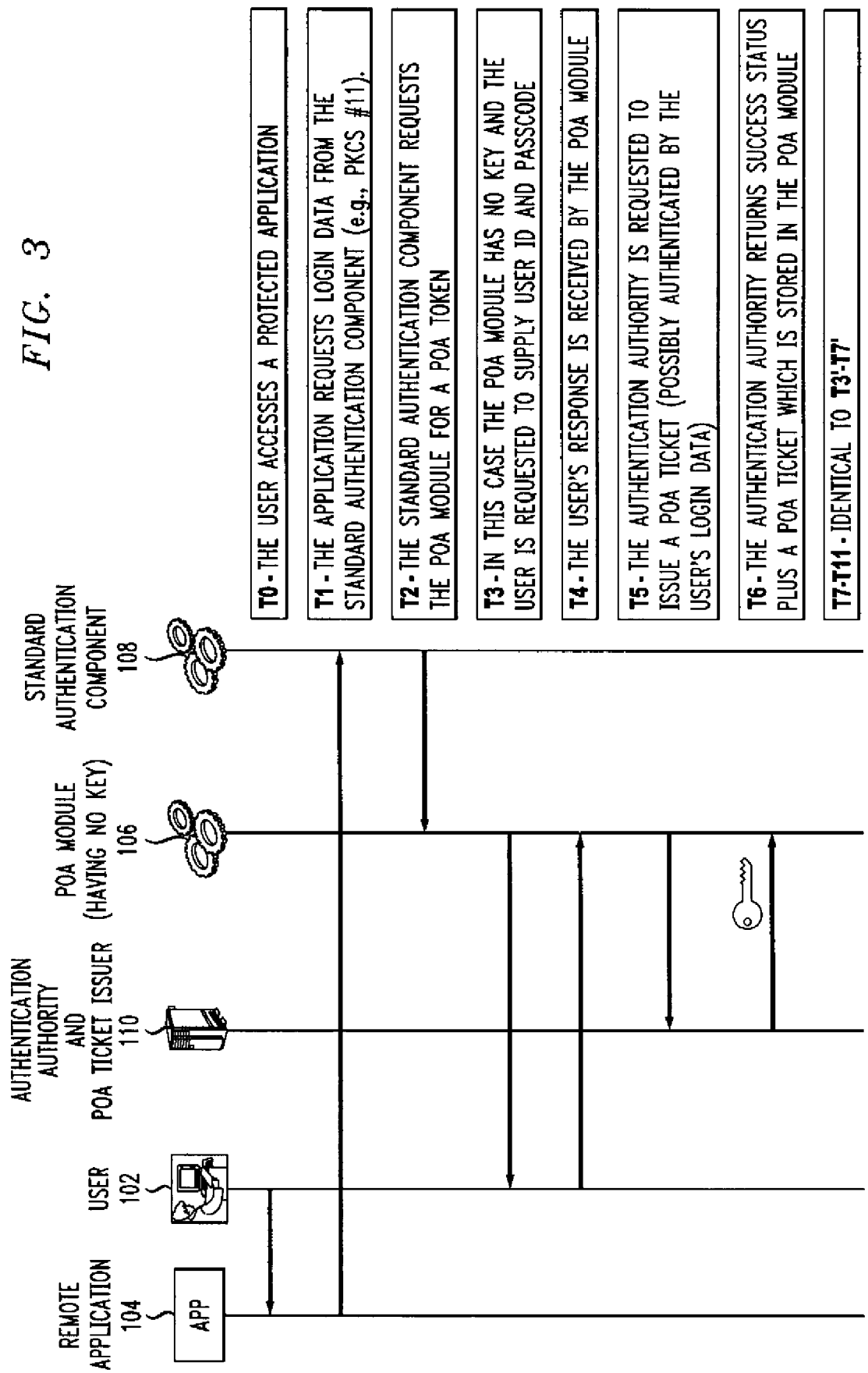
FIGS. 3 and 4 are diagrams showing authentication processes in illustrative embodiments of the invention.
Figure 4:
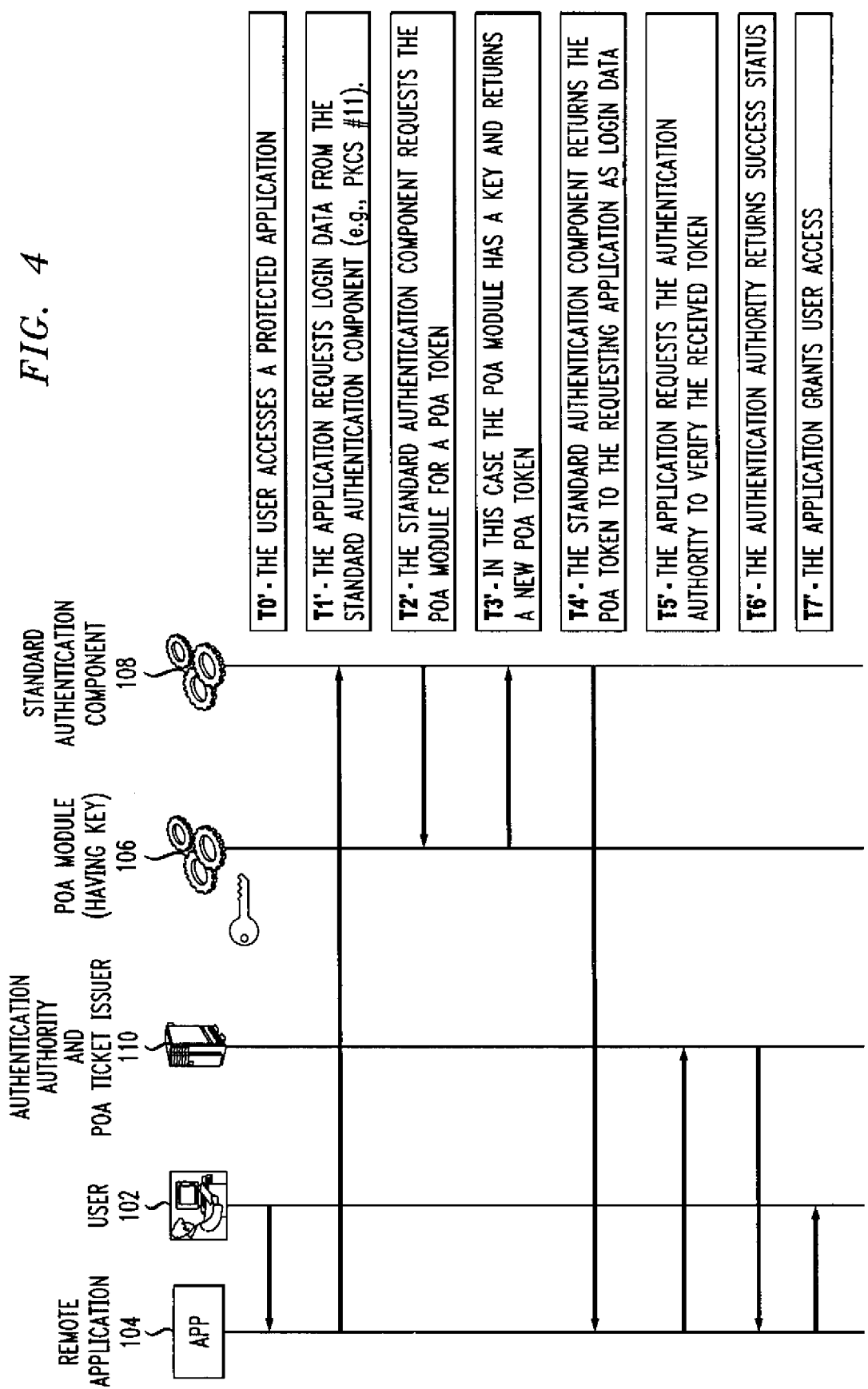

With reference now to FIGS. 3 and 4, another illustrative embodiment of a single sign-on authentication process is shown. The process in this embodiment is generally similar to that previously described. It is again assumed that this process is implemented in the system 100 of FIG. 1, utilizing interaction between system elements 102, 104, 106, 108 and 110 as shown. The authentication information again comprises a password, also referred to herein as a passcode. The return value supplied by the POA module 106 to the standard authentication component 108 is also referred to as a POA token. The ticket generated by the ticket issuer 114 of server (s) 110 for a particular user and passcode is also referred to as a "key." FIG. 3 generally illustrates the acquisition of a ticket by the POA module and the initial use of the POA value for an initial access attempt, while FIG. 4 shows the use of a POA value for a subsequent access attempt. The subsequent access attempt may be a subsequent access to the same application, or an access to a different application.

Turning initially to FIG. 3, operations associated with particular points in time denoted T0 through T11 are shown. It is assumed that the POA module 106 has no ticket or "key" for the user 102 prior to the initiation of these operations.

At time T0, the user 102 attempts to access a protected application 104, which is more specifically denoted as a remote application for purposes of this example.

At time T1, the application 104 requests login data from the standard authentication component 108. This operation may make use of a standardized programming interface, such as PKCS #11, described in RSA Laboratories, "PKCS #11: Cryptographic Token Interface Standard," Version 2.20, June 2004, which is incorporated by reference herein. For example, a library implementation of PKCS #11 may be used, calling a local service implementing the POA module whenever invoked by an application, and also requesting passwords for registered user devices when needed. The library can be dynamically linked to authenticating applications, allowing them to make use of the POA functionality without a need for modification. An extension to PKCS #11 to handle one-time passwords is also known, and may be used in conjunction with the present invention.

At time T2, the standard authentication component 108 requests a POA value, also referred to as a POA token, from the POA module 106.

At time T3, since it was assumed that the POA module 106 has no key for user 102, the user is requested to supply a user identification (ID) and passcode.

At time T4, the requested user ID and passcode from user 102 are received by the POA module 106.

At time T5, the POA module 106 requests the issuance of a ticket from element 110. In the present embodiment, it is assumed without limitation that the ticket issuer 114 is part of the authentication authority 112, such that the request for the ticket is directed to the authentication authority as shown. The ticket may be authenticated by the login data previously supplied by the user.

At time T6, the authentication authority, via its associated ticket issuer, returns a success status along with a POA ticket which is stored in the POA module.

Times T7 through T11 proceed generally in the same manner as times T3' through T7' of FIG. 4.

Turning now to FIG. 4, the POA module 106 now has a POA ticket, also referred to as a key, for the user 102. Operations associated with particular points in time denoted T0' through T7' are shown. The key was obtained via the operations associated with times T0 through T6 in FIG. 3.

At time T0', the user 102 attempts to access remote application 104. As indicated previously, this access may be a subsequent access to the same application referred to in FIG. 3, or a subsequent access to a different application.

At time T1', the application 104 requests login data from the standard authentication component 108. As noted previously, this operation may make use of a standardized programming interface, such as PKCS #11.

At time T2', the standard authentication component 108 requests a POA token from the POA module 106.

At time T3', the POA module 106, which now has a ticket or key for the user 102, returns a new POA token to the standard authentication component 108.

At time T4', the standard authentication component 108 returns the POA token to the requesting application 104 as login data.

At time T5', the application 104 issues a request to the authentication authority of element 110 to verify the received data, that is, the POA token. The application is unable to distinguish the POA token from ordinary authentication information that would otherwise be supplied by the standard authentication component 108.

At time T6', the authentication authority returns an indication of a successful authentication of the user.

At time T7', the application grants access to the user.

Subsequent accesses by user 102 to application 104 or other applications will proceed in a manner similar to that outlined in FIG. 4.

A number of additional details relating to the illustrative embodiments will now be described.

With regard to detection of password requests by standard authentication component 108, additional examples of suitable techniques may be found in U.S. patent application Ser. No. 09/356,600, entitled "System and Methods for Maintaining and Distributing Personal Security Devices," which is commonly assigned herewith and incorporated by reference herein. One such technique involves signaling that a password is being requested through the use of a special control sequence. As noted above, the calling application may request the password through a standardized programming interface such as the above-noted PKCS #11, or its extension for handling one-time passwords. This has the benefits of assuring a consistent user experience when requesting passwords, and at the same time making it simpler for applications to support multiple types of authentication credentials and authentication processes.

As mentioned above, the POA module 106 is also responsible for contacting the ticket issuer when no ticket is found for a password that is configured to be associated with a ticket. When doing this, the POA module needs to authenticate itself to the ticket issuer. The POA module may do this, for example, by providing evidence of knowledge of the password just retrieved from the user, or through some other technique, such as a technique involving a shared secret key or a public-private key pair. The latter approach has the drawback of requiring the ticket issuer to have a database of shared secrets or public keys for each POA module. The former makes use of the fact that the password is itself a shared secret and may be used to authenticate the POA module. The password should generally not be used as is, however, since such practice could disclose it to an eavesdropper. Instead, one may, for example, derive a key from the password. This may involve using the PBKDF2 method from PKCS #5, described in RSA Laboratories, "Password-Based Cryptography Standard," Version 2.0, March 1999, which is incorporated by reference herein, and then calculating an authentication code on the message requesting a ticket for the identified user:

$$ticketRequest = credentialIdentifier \| MAC_{Key1}(credentialIdentifier)$$

where $\|$ denotes concatenation, $Key_1$ is a key derived from the password, e.g., using PBKDF2, credentialIdentifter could be an identifier for the key or the user in possession of the key, and MAC denotes some well-known message authentication code algorithm such as HMAC-SHA1. Other possible techniques for using the password to authenticate the request include, for example, SPEKE, described in D. Jablon, "Strong Password-Only Authenticated Key Exchange," Computer Communication Review, ACM SIGCOMM, vol. 26, no. 5, pp. 5-26, October 1996; EKE, described in S. Bellovin and M. Merritt, "Encrypted Key Exchange: Password Based Protocols Secure against Dictionary Attacks," Proceedings of the Symposium on Security and Privacy, IEEE, 1992; or simply sending the password within a server-authenticated and privacy-protecting Transport Layer Security (TLS) session, described in T. Dierks et al., "The TLS Protocol," IETF RFC 2246.

Other information may also be present in the authenticated request, e.g., the time as seen by the POA module, an identifier for the user device, an identifier for the POA module, an identifier for the application which asked for the password, or various combinations of these or other types of information.

The ticket sent back from the ticket issuer 114 to the POA module 106 may comprise, for example, a session key, a shared secret, or a public-private key pair. Any secret value or component needs however to be protected in transit. Again, traditional techniques using a shared secret between the POA module and the ticket issuer or a PKI may be used, but with the same disadvantages as already mentioned. Another approach is to calculate a key $Key_2$ from the password, e.g., using the aforementioned PBKDF2, and then encrypt the confidential parts of the ticket response message:

$$ticketResponse = Enc_{Key2}(sessionKey) \| otherData$$

where $\|$ again denotes concatenation, $Key_2$ is a key derived from the password, e.g., using PBKDF2, and "Enc" represents some well-known encryption algorithm such as AES. The otherData variable may contain, for example, an identifier for a one-time password device, a ticket request, a state value such as the time associated with the password in case of time-based one-time password devices, or combinations of these or other types of information. The POA module calculates $Key_2$ and decrypts encrypted parts of the response to retrieve the session key or other ticket. The ticket issuer may also authenticate the response to prove that it knows the key as well as the user password. Furthermore, the ticket issuer may integrity-protect the response to protect against unauthorized modification of the contents. Similarly, the POA module may apply these protections to the ticket request preceding the response.

The POA module, may, for efficiency reasons and for better local security, choose to store not the sessionKey itself, but rather some value derived from it. One example would be to store the cryptographic hash of the session key and some other information, e.g., parts of the otherData value, and use that as a secret key when generating POA values:

$$Key_3 = Hash(sessionKey \| otherData [\| password])$$

where the optional password is the password the ticket was issued for. One reason to include the password in the calculations is that it allows the authentication authority to maintain a policy with regard to the lifetime of session keys, as will be described below.

By deriving $Key_3$ from sessionKey one allows for other uses of sessionKey without requiring it to be available in the POA module during the session. It therefore decreases the exposure of sessionKey.

Each time the POA module provides a POA value back to a requesting application, it makes use of the issued ticket. It should, however, ensure that such a value cannot be replayed by an eavesdropper overhearing the communication between the authenticating application and the authentication authority. It should also make sure that the authentication authority is able to detect that the credential is a POA value and not a password, and further that the authentication authority efficiently can validate the POA value.

There are many ways to achieve these goals, one simple method being the following:

$$POA = \text{prefix} \| MAC_{Key3}(counter)) \| otherData \| counter$$

where prefix is some, for the authentication authority, easily distinguishable prefix, allowing the authentication authority to efficiently distinguish POA values from passwords, and counter is a monotonically increasing counter value which is set to one by the POA module the first time a given session key is used and then incremented for each use. $MAC_{Key}(X)$ denotes the message authentication code of X, given key Key. The counter value allows the authentication authority to detect replay attacks. The otherData variable may include information sent from the ticket issuer in the ticket response message. As an example, when users authenticate with one-time passwords generated by an event-based device, it could be the state associated with the password used when the ticket was issued. When users authenticate with one-time passwords generated by a time-synchronous device, it could be the time associated with the password used when the ticket was issued. The inclusion of the state allows the authentication authority to efficiently re-calculate the password presented at the time of the session key issuance, and hence determine the age of the session key. This in turns enables the authentication authority to maintain a policy with regard to the lifetime of sessions. Another possibility is for the authentication authority to store the time of issuance together with the session key.

The authentication authority, having determined that an authentication request is based on a POA value and not a password, retrieves the session key for the identified user and uses it as a basis for validating the request. For example, the authentication authority may calculate the password valid at the state indicated through the otherData component in the POA value. It then calculates $Key_3$ and verifies that the authenticated portion of the POA value matches the provided counter value, and that the provided counter value is at least one higher than the recorded one. It also checks that the lifetime of the session key, as determined by the otherData and state, has not expired.

It should be noted that the authenticated part of the POA value may be truncated to allow the POA value to fit into existing legacy protocols. The truncation does not hinder the authentication authority in validating the POA value, since the otherData value is sent complete.

The POA value itself could also be encoded so as to have the same "look" as an ordinary password, e.g., only consist of letters and digits, to further ease its use in legacy protocols expecting such passwords.

As mentioned previously herein, the above-described embodiments of the invention are presented by way of illustrative example only. Numerous variations and other alternative embodiments may be used.

For example, on the user device 102, the provided session key could be regarded as the key for a "virtual" one-time password device, although that may, depending on the one-time password algorithm, complicate the goal of an unlimited number of authentications within a short time frame.

The dynamically created "virtual" one-time password device may or may not be visible to applications on the user device. Visibility may complicate the implementation since the "virtual" one-time password device should not be visible to users or applications, or else there may be a need to choose between it and the user's ordinary credentials. Visibility on the user device may however simplify usage at the authentication authority, which does not need to keep track of, or recognize "special" POA elements during an authentication operation. However, the authentication authority would need to be modified to issue the "virtual" device.

In another alternative, the POA module stores a user-provided credential and re-uses it as a POA value in subsequent authentication requests, within a specified time limit, or calculates later POA values from it. This approach suffers from several drawbacks, however. First, it would allow for replay of a POA value learnt by an attacker. As an example, if the user is tricked into providing a POA value to a malicious application, that application could then repeatedly authenticate as the user. Contrast this with the POA value with built-in replay protection as described previously herein, which only allows use of such a learnt value once. Secondly, since the entropy of a user-provided static or one-time password is relatively low, an attacker observing POA values derived from such a password may eventually be able to determine the password.

It should be noted that, if a passive attacker intercepts the original authentication communication, then that attacker could "race" the legitimate POA module for the ticket. There are several ways to protect against this. One is to use a password-protection module, as described in PCT International Application PCT/US2005/023551, filed Jul. 1, 2005 in the name of inventors B. Kaliski and M. Nystrom, which is commonly assigned herewith and incorporated by reference herein. Another alternative is to derive two values from the password, in a manner such that one value cannot be deduced from the other, and use one of the values for user authentication and the other value to authenticate the ticket request. Numerous other known password protection techniques can be used in conjunction with the present invention.

The illustrative embodiments of the invention as described herein provide an improved single sign-on capability for users of password-based authentication systems. The single sign-on capability in the illustrative embodiments is provided through the use of a POA module that generates POA values that are derived from a ticket. The ticket is issued in response to an authenticated request from the POA module to a ticket issuer. The request may be authenticated with a user-provided password that previously has been used to authenticate the user to an application.

This approach allows independent applications on a user computer or other user device, as well as applications which are remote from the user device, to obtain from the POA module a value that is derived from the ticket and to use that value to authenticate the user rather than querying the user for an additional password. An authentication authority through an associated ticket issuer can maintain a policy with regard to the lifetime of issued tickets and any credentials derived from them, and protect against misuse of the initially provided password.

Advantageously, the illustrative embodiments do not require changes to existing communication protocols nor that authenticating applications be aware of the existence of tickets, only of the need to authenticate users. It is therefore transparent to both existing applications and communication protocols. The described techniques may be used with security tokens that generate one-time passwords or other types of authentication information, regardless of whether such tokens are connectable to the user device. The limited use of the original credential also means that the method described herein is less vulnerable to host compromises.

The described techniques may be adapted in a straightforward manner to other environments. Such other environments may include, for instance, environments where there is a need to repeatedly authenticate users to a protected resource, e.g., personal information management synchronization applications such as Microsoft ActiveSync, or environments where a client acting on behalf of a user repeatedly needs to authenticate to a protected resource, e.g., content aggregator clients such as Yodlee or virtual checkbooks such as those available from Quicken or MS Money, and numerous other contexts involving access-controlled applications or other resources.

Another exemplary environment in which the above-described techniques may be applied is one in which a user logs on to a host in offline (i.e., not connected to a network) mode and subsequently the host is connected and one would like to avoid having the user authenticate again to get access to networked resources. Such an arrangement should be understood to involve multiple access requests as that term is used herein.

It should again be emphasized that the particular single sign-on authentication techniques described above are provided by way of illustration, and should not be construed as limiting the present invention to any specific embodiment or group of embodiments. For example, as previously noted, the described embodiments may be adapted in a straightforward manner to operate with other types of credentials or authentication information, rather than just passwords, and other types of access-controlled resources, rather than just applications. Also, the particular configuration of system elements shown in FIGS. 1 and 2, and their interactions as shown in FIGS. 3 and 4, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method of controlling user access to a resource, the method comprising steps of:

issuing an authentication information request to a standard authentication component responsive to an access request from the user;

receiving responsive to the authentication information request a first proof-of-authentication value from the standard authentication component; and authenticating the user based on the first proof-of-authentication value;

wherein the user if authenticated is granted access to the resource;

wherein the standard authentication component interacts with a proof-of-authentication module to obtain the first proof-of-authentication value, said proof-of-authentication module being configured to generate one or more additional proof-of-authentication values for use with respective one or more additional access requests of said user; and wherein the standard authentication component interacts with the proof-of-authentication module to obtain the first proof-of-authentication value based on a ticket previously issued by a ticket issuer, said proof-of-authentication module being configured to generate from said ticket the one or more additional proof-of-authentication values for use with the respective one or more additional access requests of said user.

2. The method of claim 1 wherein the ticket comprises a secret shared between the proof-of-authentication module and an authentication authority.

3. The method of claim 1 wherein the ticket is issued by the ticket issuer responsive to a successful authentication of the user based on an authentication credential submitted by said user.

4. The method of claim 3 wherein the authentication credential comprises at least a portion of at least one password.

5. The method of claim 4 wherein the password comprises a one-time password generated by a security token.

6. The method of claim 1 wherein the standard authentication component comprises an interface that conforms to a PKCS #11 standardized programming interface.

7. The method of claim 1 wherein said resource comprises an application.

8. The method of claim 7 wherein the standard authentication component comprises an authentication information request-detecting component configured to detect an authentication information request that is generated by the application when a need to authenticate the user arises.

9. The method of claim 7 wherein the standard authentication component receives a notification generated by the application when a need to authenticate the user arises.

10. The method of claim 1 wherein the authentication information request comprises a request for at least a portion of at least one password or other authentication credential associated with the user.

11. The method of claim 1 wherein the step of authenticating the user based on the first proof-of-authentication value comprises issuing a request to an authentication authority to verify the first proof-of-authentication value.

12. The method of claim 11 wherein the authentication authority verifies the first proof-of-authentication value by checking that it is valid, has not been used before, and is within a designated lifetime of a corresponding session.

13. The method of claim 1 wherein if the proof-of-authentication module determines that no ticket has yet been established for a given user, it obtains authentication information for the given user, and then interacts with the ticket issuer to establish a ticket for the given user based on the authentication information of that user.

14. The method of claim 13 wherein the proof-of-authentication module issues a request to the ticket issuer for generation of a ticket based on the authentication information and in conjunction with the request provides the ticket issuer with information utilizable to authenticate the proof-of-authentication module to the ticket issuer.

15. The method of claim 14 wherein the information utilizable to authenticate the proof-of-authentication module to the ticket issuer is obtained by generating a key from the authentication information and utilizing the key to generate a message authentication code on the request for generation of a ticket.

16. The method of claim 14 wherein the ticket issuer interacts with an authentication authority to determine if the request for generation of a ticket is authentic and if so generates the ticket and supplies it to the proof-of-authentication module.

17. The method of claim 1 wherein the ticket issuer supplies the ticket to the proof-of-authentication module at least partly in encrypted form.

18. The method of claim 1 wherein the ticket is stored locally by the proof-of-authentication module.

19. The method of claim 13 wherein a key for encrypting at least a portion of the ticket is derived from the authentication information.

20. The method of claim 1 wherein the ticket comprises at least one of a session key, a shared secret and a public-private key pair.

21. The method of claim 1 wherein the standard authentication component obtains authentication information from the user, utilizes the authentication information to obtain the ticket from the ticket issuer, and supplies the ticket to the proof-of-authentication module for use in generating one or more of the proof-of-authentication values.

22. The method of claim 1 wherein the proof-of-authentication module stores information derived from the ticket rather than storing the ticket itself and generates one or more of the proof-of-authentication values based on the stored information.

23. The method of claim 1 wherein at least the first proof-of-authentication value is configured so as to be distinguishable from the authentication information by an authentication authority.

24. The method of claim 1 wherein at least the first proof-of-authentication value is configured to permit an authentication authority to determine if the proof-of-authentication value has been used before.

25. A machine-readable storage medium for storing one or more software programs for use in controlling user access to an access-controlled resource, wherein the one or more software programs when executed by one or more processing devices implement the steps of the method of claim 1.

26. A method of controlling user access to a resource, the method comprising steps of:

issuing an authentication information request to a standard authentication component responsive to an access request from the user;

receiving responsive to the authentication information request a first proof-of-authentication value from the standard authentication component; and authenticating the user based on the first proof-of-authentication value;

wherein the user if authenticated is granted access to the resource;

wherein the standard authentication component interacts with a proof-of-authentication module to obtain the first proof-of-authentication value, said proof-of-authentication module being configured to generate one or more additional proof-of-authentication values for use with respective one or more additional access requests of said user; and wherein said resource comprises an application; and wherein the application is not aware that a given proof-of-authentication value that it receives from the standard authentication component is generated based on a corresponding ticket, and is unable to distinguish said given proof-of-authentication value from the authentication information.

27. An apparatus comprising at least one processing device having a processor coupled to a memory, said processing device implementing at least one of a standard authentication component and a proof-of-authentication module, and being configured for use in controlling user access to a resource, wherein in conjunction with an access request from the user, a corresponding authentication information request is issued to the standard authentication component, a first proof-of-authentication value is received from the standard authentication component responsive to the authentication information request, and the user is authenticated based on the first proof-of-authentication value, wherein the user if authenticated is granted access to the resource, wherein the standard authentication component interacts with the proof-of-authentication module to obtain the first proof-of-authentication value, said proof-of-authentication module being configured to generate one or more additional proof-of-authentication values for use with respective one or more additional access requests of said user, and wherein the standard authentication component interacts with the proof-of-authentication module to obtain the first proof-of-authentication value based on a ticket previously issued by a ticket issuer, said proof-of-authentication module being configured to generate from said ticket the one or more additional proof-of-authentication values for use with the respective one or more additional access requests of said user.

28. The apparatus of claim 27 wherein the standard authentication component and the proof-of-authentication module are implemented on separate processing devices.

29. The apparatus of claim 27 wherein the ticket comprises a secret shared between the proof-of-authentication module and an authentication authority.

30. The apparatus of claim 27 wherein the standard authentication component obtains authentication information from the user, utilizes the authentication information to obtain the ticket from the ticket issuer, and supplies the ticket to the proof-of-authentication module for use in generating one or more of the proof-of-authentication values.

31. A system for controlling user access to a resource, comprising:
 a standard authentication component;
 a proof-of-authentication module configured for communication with the standard authentication component; and
 a ticket issuer configured to issue a ticket to the proof-of authentication module;
 wherein in conjunction with an access request from the user, a corresponding authentication information request is issued to the standard authentication component, a first proof-of-authentication value is received from the standard authentication component responsive to the authentication information request, and the user is authenticated based on the first proof-of-authentication value;
 wherein the user if authenticated is granted access to the resource;
 wherein the standard authentication component interacts with the proof-of-authentication module to obtain the first proof-of-authentication value, said proof-of-authentication module being configured to generate one or more additional proof-of-authentication values for use with respective one or more additional access requests of said user; and
 wherein the standard authentication component interacts with the proof-of-authentication module to obtain the first proof-of-authentication value based on the ticket issued by the ticket issuer, said proof-of-authentication module being configured to generate from said ticket the one or more additional proof-of-authentication values for use with the respective one or more additional access requests of said user;
 wherein said standard authentication component, said proof-of-authentication module and said ticket issuer are implemented using at least one processing device having a processor coupled to a memory.

32. The system of claim 31 wherein the standard authentication component and the proof-of-authentication module are implemented using separate processing devices each comprising a processor coupled to a memory.

33. The system of claim 31 wherein the standard authentication component obtains authentication information from the user, utilizes the authentication information to obtain the ticket from the ticket issuer, and supplies the ticket to the proof-of-authentication module for use in generating one or more of the proof-of-authentication values.

* * * * *